United States Patent
Yamamoto et al.

(10) Patent No.: US 10,883,736 B2
(45) Date of Patent: Jan. 5, 2021

(54) FAN DRIVE CIRCUIT FOR HEAT PUMP DEVICE

(71) Applicant: DAIKIN INDUSTRIES, LTD., Osaka (JP)

(72) Inventors: Akiyoshi Yamamoto, Osaka (JP); Kazushige Maeda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 96 days.

(21) Appl. No.: 16/076,891

(22) PCT Filed: Dec. 22, 2016

(86) PCT No.: PCT/JP2016/088355
§ 371 (c)(1),
(2) Date: Aug. 9, 2018

(87) PCT Pub. No.: WO2017/183234
PCT Pub. Date: Oct. 26, 2017

(65) Prior Publication Data
US 2019/0086111 A1    Mar. 21, 2019

(30) Foreign Application Priority Data

Apr. 18, 2016 (JP) ................... 2016-083088

(51) Int. Cl.
*F24F 11/36* (2018.01)
*F24F 11/74* (2018.01)
(Continued)

(52) U.S. Cl.
CPC .............. *F24F 11/36* (2018.01); *F24F 11/74* (2018.01); *F24F 11/88* (2018.01); *F25B 1/00* (2013.01); *F25B 49/02* (2013.01)

(58) Field of Classification Search
CPC .. F24F 11/36; F24F 11/74; F24F 11/88; F25B 1/00; F25B 49/02; F25B 2500/22; F25B 2500/222
See application file for complete search history.

(56) References Cited

U.S. PATENT DOCUMENTS

| 5,934,090 A | 8/1999 | Ozu et al. |
| 2008/0201031 A1 | 8/2008 | Ito et al. |

(Continued)

FOREIGN PATENT DOCUMENTS

| EP | 2618079 A1 | 7/2013 |
| JP | 04-225769 A | 8/1992 |

(Continued)

*Primary Examiner* — Marc E Norman
(74) *Attorney, Agent, or Firm* — Birch, Stewart, Kolasch & Birch, LLP (57) ABSTRACT

A fan drive circuit 1 for a heat pump device is provided. The heat pump device blows air heat exchanged by a heat exchanger using a mildly-flammable or flammable refrigerant having a specific gravity greater than that of air from a blowout port using a fan. The fan drive circuit 1 is equipped with a forced operation circuit configured to operate the fan in the event that it is undetectable that a protection device for preventing a leaked refrigerant from the heat pump device from reaching a combustible density is connected to the heat pump device.

13 Claims, 7 Drawing Sheets

(51) Int. Cl.
*F24F 11/88* (2018.01)
*F25B 49/02* (2006.01)
*F25B 1/00* (2006.01)

(56) References Cited

U.S. PATENT DOCUMENTS

2017/0198936 A1   7/2017  Yamaguchi
2018/0283718 A1*  10/2018 Honda ................... F25B 13/00

FOREIGN PATENT DOCUMENTS

| | | |
|---|---|---|
| JP | 05-133629 A | 5/1993 |
| JP | 6-269280 A | 9/1994 |
| JP | 11-37619 A | 2/1999 |
| JP | 11-190564 A | 7/1999 |
| JP | 2000-146393 A | 5/2000 |
| JP | 2008-201213 A | 9/2008 |
| JP | 2011-121736 A | 6/2011 |
| JP | 2012-229863 A | 11/2012 |
| JP | 2013-167393 A | 8/2013 |
| JP | 2014-126253 A | 7/2014 |
| WO | WO 2015/194596 A1 | 12/2015 |

* cited by examiner

FAN DRIVE CIRCUIT FOR HEAT PUMP DEVICE

TECHNICAL FIELD

The present invention relates to a fan drive circuit for a heat pump device.

BACKGROUND ART

In recent years, in an air conditioning apparatus for heating and cooling an inside of a room by a vapor compression type refrigerating cycle, adoption of an R32 refrigerant having a low global warming potential is progressing. However, the R32 refrigerant is slightly flammable (mildly-flammable), and especially in the case of floor mount type indoor unit, when a refrigerant having a specific gravity greater than that of air leaks, there is a possibility that the leaked refrigerant accumulates in the vicinity of a floor to reach a combustible density.

To prevent a leaked refrigerant from accumulating to reach a combustible density, various protection devices or protection mechanisms (hereinafter correctively referred to as a "protection device") can be conceived. For example, it has been proposed that, a refrigerant sensor as a protection device to determine the presence or absence of a leakage from a refrigerant circuit is arranged in indoor unit, when the refrigerant sensor detects the leakage of the refrigerant, an indoor fan provided to the indoor unit is driven to diffuse the leaked refrigerant (for example, see Patent Documents 1 and 2). According to the indoor unit as described in Patent Documents 1 and 2, it is possible to prevent the leaked refrigerant from reaching a combustible density by diffusing the leaked refrigerant with an air blast, which can secure the safety of indoor residents at the time of the refrigerant leakage.

Further, as a protection device other than a refrigerant sensor, an alarm configured to notify a user of a refrigerant leakage by sound, light, etc., a ventilator configured to forcibly discharge air including a leaked refrigerant in a room to the outside, and the like can be conceived. By using such protection devices individually or in combination, it is possible to prevent a leaked refrigerant from indoor unit from accumulating on a floor, etc., of an air-conditioned room to reach a combustible density.

PRIOR ART DOCUMENT

Patent Document

Patent Document 1: Japanese Unexamined Patent Publication No. 11-37619
Patent Document 2: International Publication No. WO/2015/194596

SUMMARY OF THE INVENTION

Problems to be Solved by the Invention

When the aforementioned various kinds of protection devices are suitably connected to indoor unit, it is possible to prevent a leaked refrigerant from reaching a combustible density by exerting their functions. However, when the connection to the indoor unit is failed, the protection function cannot be exerted, which may allow the leaked refrigerant to reach a combustible density. Note that the term "connection" in this specification means to include not only a state in which indoor unit and a protection device are connected by wire but also a state in which they are wirelessly communicated with each other.

The present invention has been made in view of the aforementioned circumstances, and aims to provide a fan drive circuit for a heat pump device capable of preventing a leaked refrigerant from reaching a combustible density even if the refrigerant leaks when a protection device and a heat pump device such as indoor unit are disconnected.

Means for Solving the Problems

The fan drive circuit for a heat pump device (hereinafter also simply referred to as a "fan drive circuit") according to the present invention is (1) a fan drive circuit for a heat pump device configured to blow air heat exchanged by a heat exchanger using a mildly-flammable or flammable refrigerant having a specific gravity greater than air from a blowout port using a fan, the fan drive circuit including:

a forced operation circuit configured to operate the fan in an event that it is undetectable that a protection device configured to prevent a leaked refrigerant from the heat pump device from reaching a combustible density is connected to the heat pump device.

The fan drive circuit of the present invention is equipped with the forced operation circuit and the forced operation circuit operates the fan in the event that it is undetectable that the protection device configured to prevent a leaked refrigerant from the heat pump device from reaching a combustible density is connected to the heat pump device. That is, it is configured such that, when the protection device such as a refrigerant sensor and the heat pump device are disconnected and therefore the protection function of the protection device cannot be exerted, the fan is forcibly operated as a fail-safe. With this, even if a refrigerant leaks in a state in which the protection device and the heat pump device are disconnected, it is possible to diffuse the leaked refrigerant by the forced operation of the fan to prevent the refrigerant from accumulating on a floor, etc., of an air-conditioned room to reach a combustible density, which can secure the safety of indoor residents, etc., at the time of the refrigerant leakage. Note that the "heat pump device" in this specification refers to a device for transferring heat using a refrigerant and a heat exchanger, and denotes a concept that includes not only the aforementioned indoor unit for an air conditioner but also outdoor unit for an air conditioner, a water heater for supplying hot water, etc.

(2) In the fan drive circuit of the aforementioned Item (1), the forced operation circuit may be made into a closed circuit on a power source side than an operation switch of the heat pump device. In this case, regardless of whether or not the heat pump device is in an operation state, by operating the fan in the event that it is undetectable that the protection device is connected to the heat pump device, even if the refrigerant leaks in a state in which the protection device and the heat pump device are disconnected, it is possible to defuse the leaked refrigerant by the forced operation of the fan to thereby always prevent the leaked refrigerant from accumulating on the floor, etc., of the air conditioned room to reach a combustible density.

(3) In the fan drive circuit of the aforementioned Item (1) or (2), it may further include a relay configured to make the forced operation circuit into an open state when the protection device is connected to the heat pump device. In this case, in a normal state in which the protection device is connected to the heat pump device, the opening and closing control of the forced driving circuit can be performed.

(4) In the fan drive circuit of any one of the aforementioned Items (1) to (3), the protection device may be a refrigerant sensor configured to detect the refrigerant leakage from the heat exchanger or refrigerant piping connected to the heat exchanger. In this case, when the refrigerant sensor and the heat pump device are disconnected and therefore the function of the refrigerant sensor cannot be exerted, the fan is forcibly operated as a fail-safe. Therefore, even if the refrigerant leaks, the leaked refrigerant is diffused by the forcible operation of the fan, so that the leaked refrigerant can be prevented from accumulating on the floor, etc., of the indoor room to reach a combustible density.

Effects of the Invention

According to the fan drive circuit of the present invention, when the protection device and the heat pump device are disconnected, even if the refrigerant leaks, it is possible to prevent the leaked refrigerant from reaching a combustible density.

EMBODIMENTS FOR CARRYING OUT THE INVENTION

Hereinafter, the fan drive circuit of the present invention will be explained in detail with reference to the attached drawings. It should be noted that the present invention is not limited to these examples, but is indicated by claims, and is intended to include any modifications within the equivalent meaning and the cope of claims.

Figure 1:
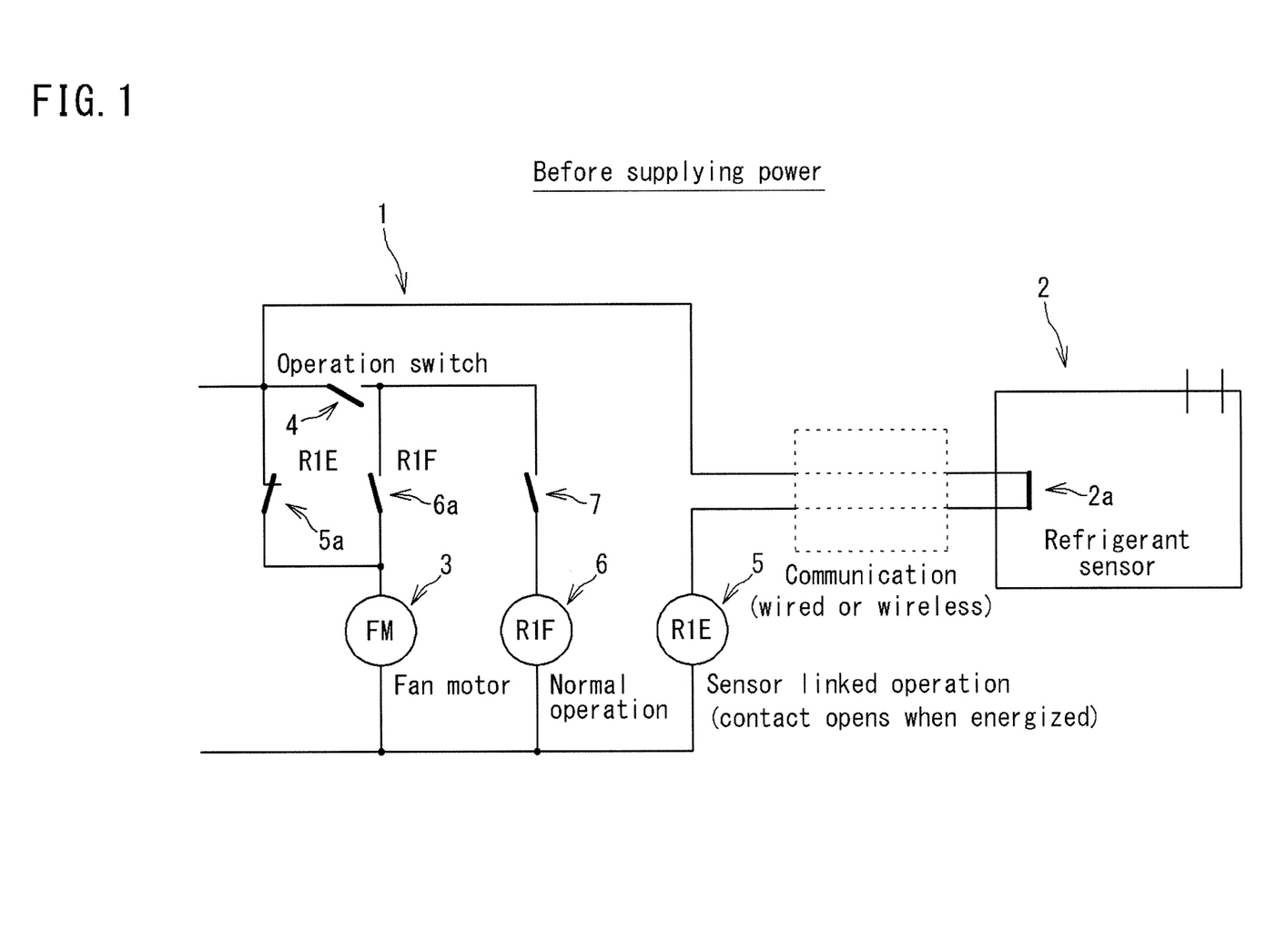
FIG. 1 is an explanatory drawing showing one embodiment of the fan drive circuit of the present invention (before supplying power).
Figure 2:
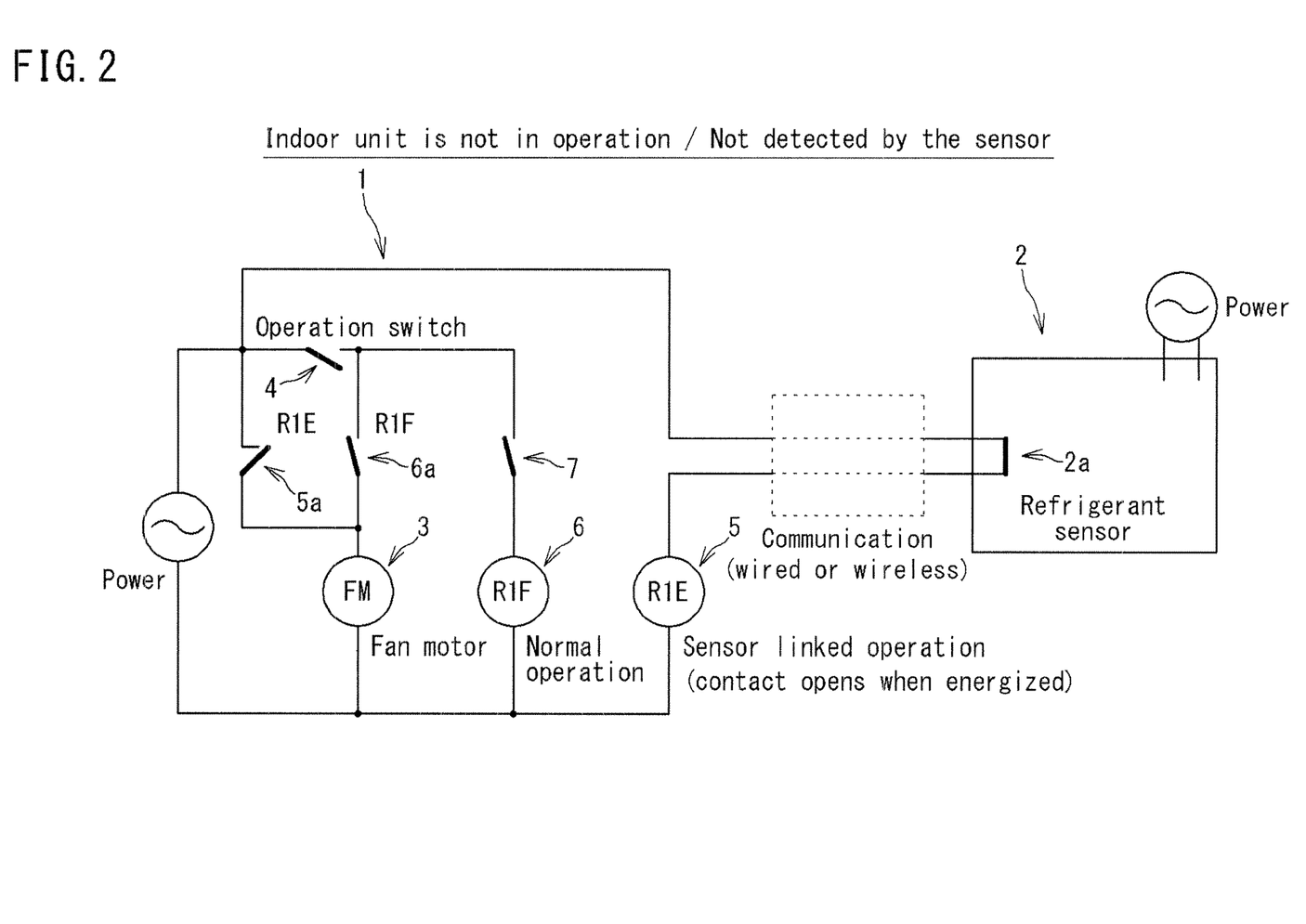
FIG. 2 is an explanatory drawing showing one embodiment of the fan drive circuit of the present invention (the indoor unit is not in operation, not detected by the sensor).
Figure 3:
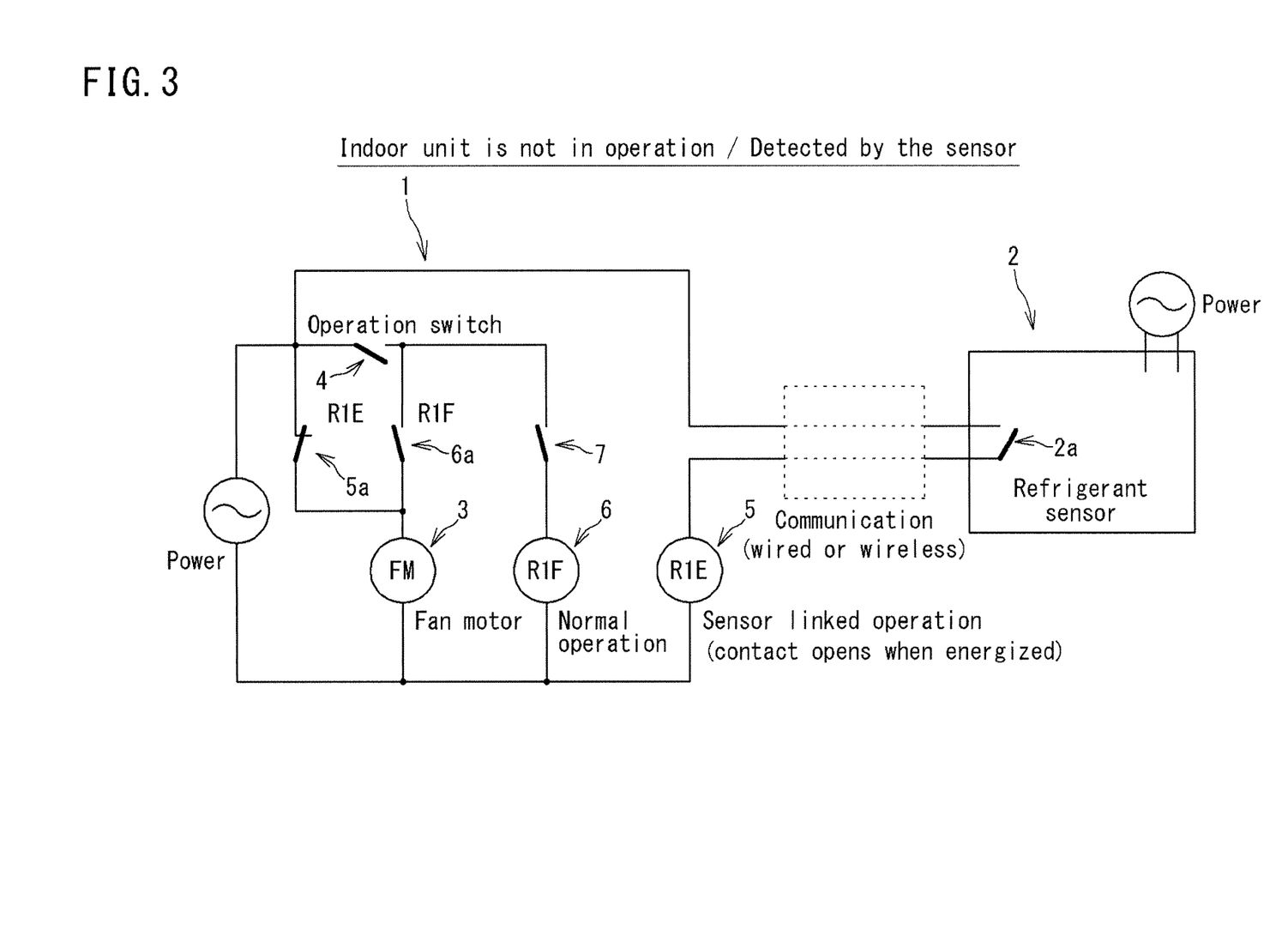
FIG. 3 is an explanatory drawing showing one embodiment of the fan drive circuit of the present invention (the indoor unit is not in operation, detected by the sensor).
Figure 4:
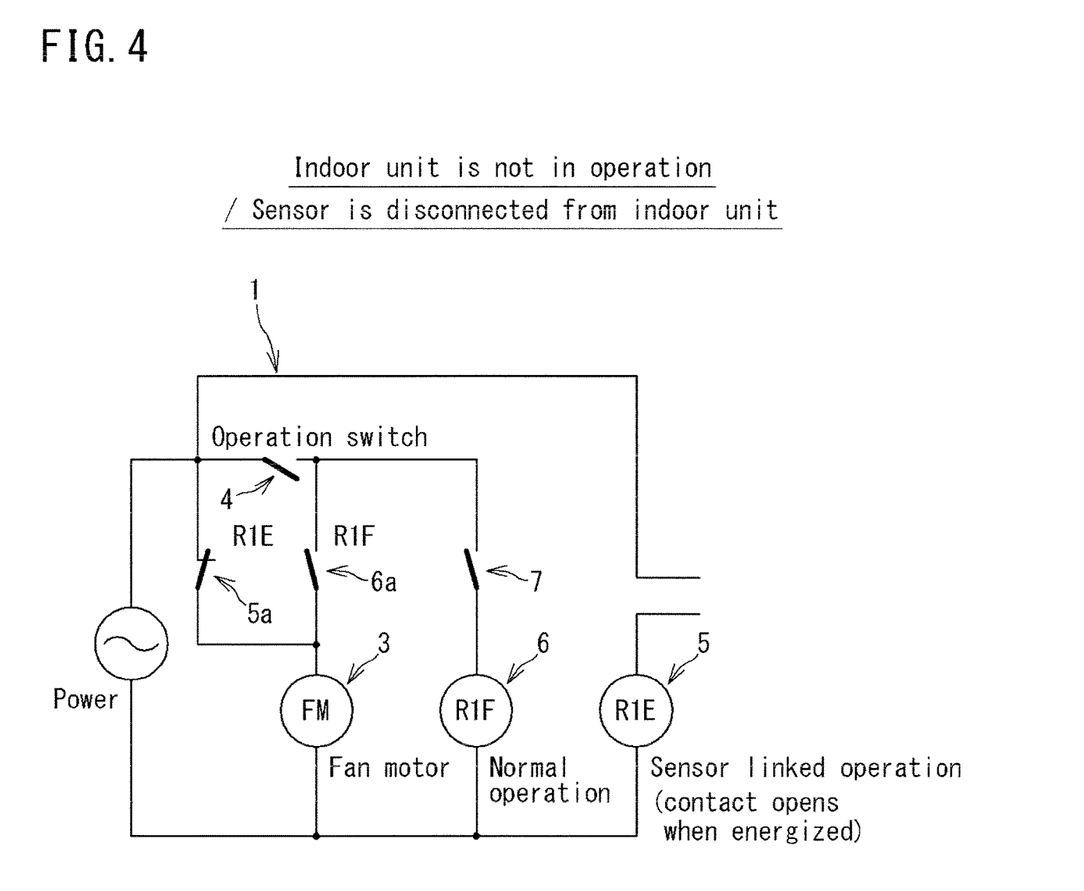
FIG. 4 is an explanatory drawing showing one embodiment of the fan drive circuit of the present invention (the indoor unit is not in operation, the sensor is disconnected).
Figure 5:
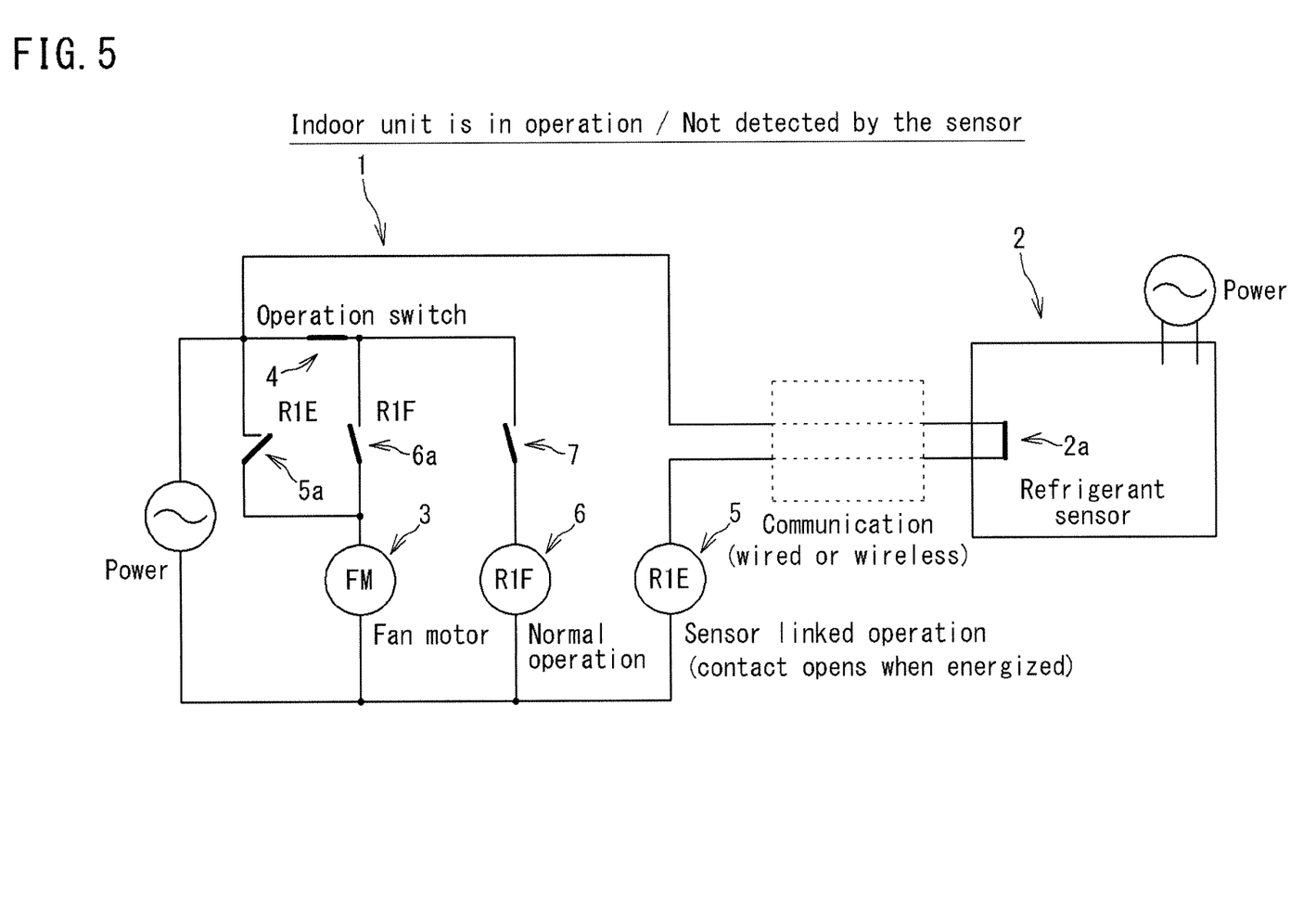
FIG. 5 is an explanatory drawing showing one embodiment of the fan drive circuit of the present invention (the indoor unit is in operation, not detected by the sensor).
Figure 6:
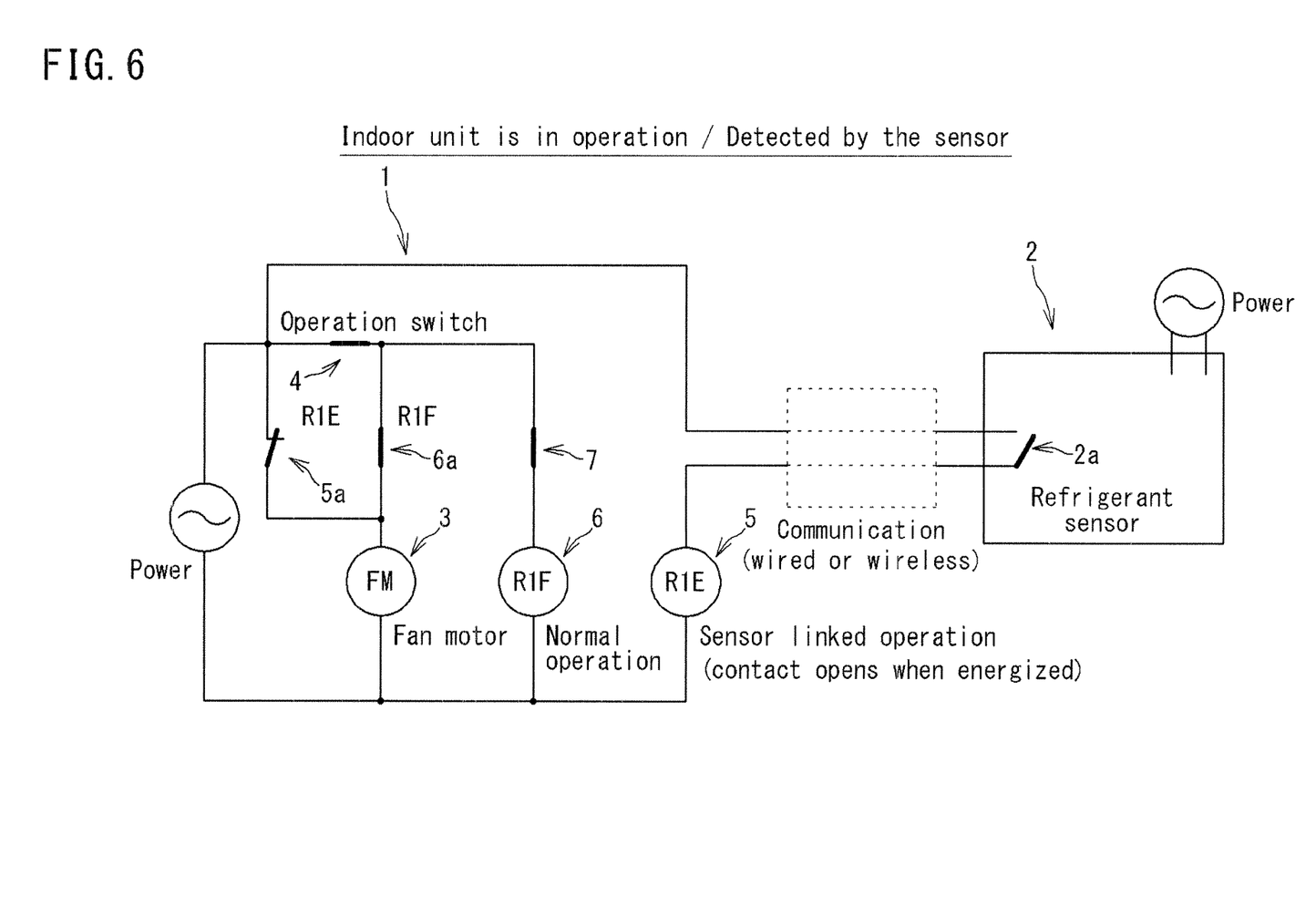
FIG. 6 is an explanatory drawing showing one embodiment of the fan drive circuit of the present invention (the indoor unit is in operation, detected by the sensor).
Figure 7:
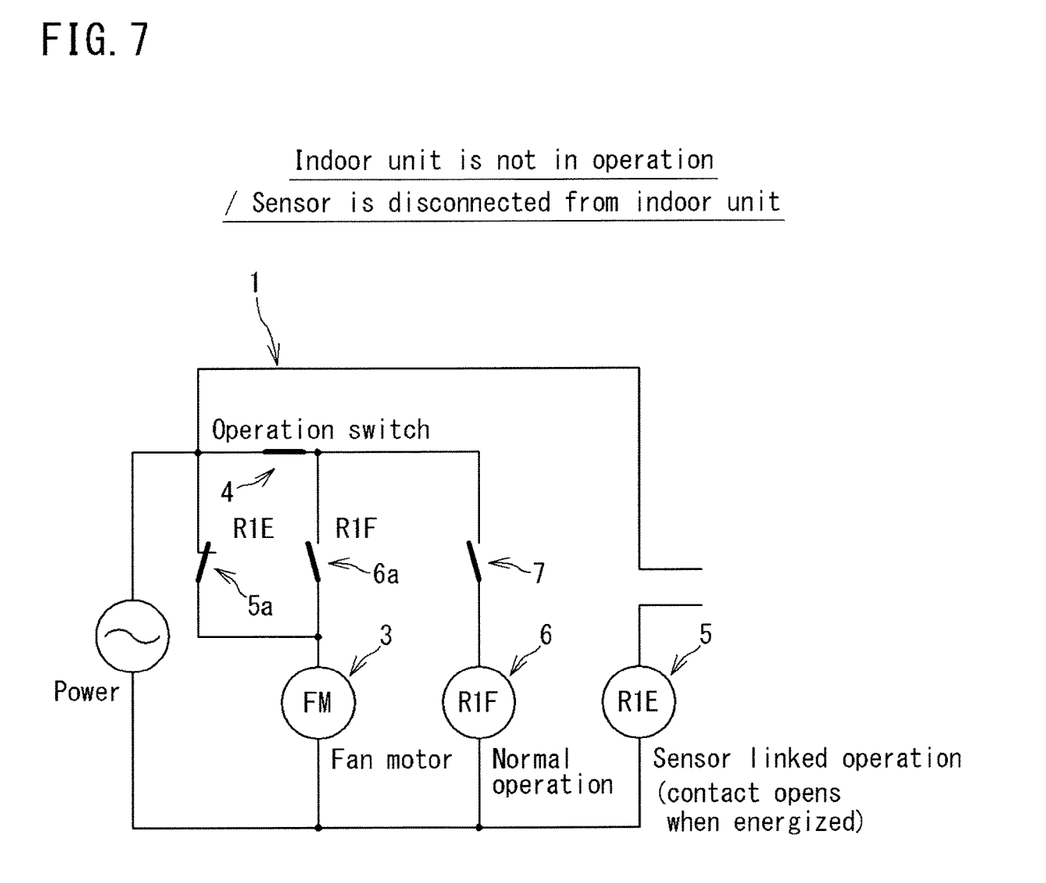
FIG. 7 is an explanatory drawing showing one embodiment of the fan drive circuit of the present invention (the indoor unit is in operation, the sensor is disconnected).

FIG. 1 is an explanatory drawing of a fan drive circuit 1 according to an embodiment of the present invention and shows the fan drive circuit 1 in a state before power is supplied to the indoor unit which is a heat pump device and a refrigerant sensor 2 as a protection device. FIG. 2 to FIG. 4 are explanatory drawings of the fan drive circuit 1 in which power is supplied to the indoor unit and the refrigerant sensor 2 but the indoor unit is not in operation. FIG. 5 to FIG. 7 are explanatory drawings of the fan drive circuit 1 in which power is separately supplied to the indoor unit and the refrigerant sensor 2 and the indoor unit is in operation.

The fan drive circuit 1 according to this embodiment is a circuit for driving an indoor fan provided in an air conditioner or an air conditioning machine equipped with the indoor unit and outdoor unit. The indoor unit is equipped with a heat exchanger, etc., other than the indoor fan, and blows the conditioned air heat exchanged by the heat exchanger from a blowout port by the indoor fan. The heat exchanger performs heat exchange with the air sucked into the device by the indoor fan using a mildly-flammable or flammable refrigerant, such as, e.g., an R32 refrigerant, having a specific gravity greater than that of air.

The fan drive circuit of the present invention is a circuit for preventing a mildly-flammable or flammable refrigerant leaked from a heat exchanger or refrigerant piping connected to the heat exchanger from accumulating on a floor, etc., of an air-conditioned room, such as, e.g., a living room, in which the indoor unit is arranged to reach a combustible density. Therefore, the fan drive circuit of the present invention can be suitably applied to floor mount type indoor unit in which the possibility that a leaked refrigerant accumulates on a floor, etc., is comparatively high, but the present invention is not limited to that. For example, the present invention can also be applied to other indoor unit, such as, e.g., ceiling-mounted type indoor unit and wall-mounted type indoor unit, and other heat pump devices, such as, e.g., outdoor unit and a water heater. Further, the present invention can also be applied not only to indoor unit for performing air conditioning of a living room in which people stay but also to indoor unit for performing air conditioning for a space in which machines and devices are mainly arranged, such as, e.g., a server room and a clean room.

The fan drive circuit 1 and the refrigerant sensor 2 are connected in a communicable manner with each other by wire or wirelessly. As wireless communication, for example, communication can be performed using infrared rays. The refrigerant sensor 2 may be provided inside indoor unit, e.g., below a heat exchanger or below a connection portion of the heat exchanger and the refrigerant piping, but it may also be provided at an arbitral position in an air conditioned room in which the refrigerant is likely to accumulate when the refrigerant leaks. In the latter case, normally, the refrigerant sensor 1 and the indoor unit are wirelessly connected in a communicable manner with each other.

When the refrigerant sensor 2 in this embodiment detects a refrigerant, the contact 2a of the refrigerant sensor 2 opens, so that the circuit including the refrigerant sensor 2 becomes in an open state (see FIG. 3).

The fan drive circuit 1 is equipped with a forced operation circuit configured to operate a fan motor 3 of an indoor fan in the event that it is undetectable that the refrigerant sensor 2 is connected to the indoor unit. The forced operation circuit may be made into a closed circuit on the power source side than the operation switch 4 of the indoor unit. Specifically, the forced operation circuit may be made into a closed circuit including the refrigerant sensor 2, the fan motor 3, and a first relay 5 on the power supply side than the operation switch 4.

The first relay 5 operates in conjunction with the refrigerant sensor 2. The first relay 5 is equipped with a b-contact 5a constituting a closed circuit including the fan motor 3 on the power supply side than the operation switch 4 of the indoor unit. Further, the fan drive circuit 1 is equipped with a second relay 6. The second relay 6 is a relay on the control side of the indoor unit, and is equipped with an a-contact 6a which becomes in a "closed" state when energized. When the operation switch 4 of the indoor unit, i.e., the air conditioner, becomes an "ON" state by the operation of the remote control, a contact 7 is closed by the instruction from the controller of a microcomputer, etc., of the air conditioner. With this, the second relay 6 is energized. When the second relay 6 is energized, the a-contact 6a of the second relay 6 becomes a closed state, so that the fan motor 3 is driven according to the normal control of the indoor unit (see FIG. 5).

[Fan Drive Circuit when the Indoor Unit is not in Operation]

FIG. 2 shows a state in which power is supplied to the indoor unit and the refrigerant sensor 2, but the indoor unit is not in operation and the refrigerant sensor 2 is detecting no refrigerant.

In a state in which the indoor unit is not in operation, as shown in FIG. 3, when the refrigerant sensor 2 detects a refrigerant, the contact 2a of the refrigerant sensor 2 opens as described above and the first relay 5 becomes in a non-energized state. When the first relay 5 becomes in the non-energized state, the b-contact 5a of the first relay 5 is closed. In the indoor unit, although the normal operation by the microcomputer control is not in operation, the fan motor 3 is driven to forcibly operate the indoor fan 3. Therefore, even when the indoor unit is not in operation, since the indoor fan is forcibly operated when the refrigerant sensor 2 detects a leaked refrigerant, the leaked refrigerant can be diffuse, which prevents the leaked refrigerant from accumulating on the floor, etc., of the air conditioned room to reach a combustible density.

In this embodiment, even in cases where the leaked refrigerant detection function of the refrigerant sensor 2 cannot be exerted when it becomes not only the event that the refrigerant sensor 2 detects a refrigerant when the indoor unit is not in operation but also the event that the refrigerant sensor 2 and the indoor unit are disconnected when the indoor unit is not in operation and therefore the connection cannot be detected, the indoor fan can be forcibly operated. Specifically, as shown in FIG. 4, when the refrigerant sensor 2 is disconnected from the indoor unit, the first relay 5 becomes in a non-energized state. When the first relay 5 becomes in the non-energized state, the b-contact 5a of the first relay 5 is closed. Therefore, even though the indoor unit is not in operation, the fan motor 3 is driven to forcibly operate the indoor fan.

The fan drive circuit according to this embodiment is configured to operate on the safe side as a fail-safe even in a non-operation state of the indoor unit. With this, even if the refrigerant leaks in a state in which the refrigerant sensor 2 and the indoor unit are disconnected, the indoor fan is forcibly operated to prevent the leaked refrigerant from accumulating on the floor, etc., of the air conditioned room to reach a combustible density. As a result, the safety of indoor residents, or machines and devices arranged indoors at the time of the refrigerant leakage can be secured.

[Fan Drive Circuit when the Indoor Unit is in Operation]

FIG. 5 shows the fan drive circuit 1 in a state in which the indoor unit is in operation and the refrigerant sensor 2 is detecting no refrigerant. As described above, when the operation switch 4 of the air conditioner, i.e., the air conditioning machine, becomes in an "ON" state by the operation of a remote controller, the contact 7 is closed by the instruction from a controller of a microcomputer, etc., of the air conditioner. With this, the second relay 6 is energized. When the second relay 6 is energized, the a-contact of the second relay 6 becomes in a closed state, and the fan motor 3 is driven according to the normal control of the indoor unit, and the compressor in the outdoor unit also becomes an operable state.

In a state in which the indoor unit is in operation, as shown in FIG. 6, when the refrigerant sensor 2 detects a refrigerant, the contact 2a of the refrigerant sensor 2 opens as described above and the first relay 5 becomes in an non-energized state. When the first relay 5 becomes in the non-energized state, the b-contact 5a of the first relay 5 is closed, and the indoor fan is switched from an operation mode by a normal control (FIG. 5) to a forced operation mode. Therefore, for example, even when the indoor unit is being operated in a "low wind velocity" state by the operation mode by a normal control, when the refrigerant sensor 2 detects a leaked refrigerant, the indoor fan is forcibly operated, for example, in a "high wind velocity" state, so that the leaked refrigerant can be diffused. Therefore, the leaked refrigerant can be prevented from accumulating on the floor, etc., of the air conditioned room to reach a combustible density.

In this embodiment, even in cases where the leaked refrigerant detection function of the refrigerant sensor 2 cannot be exerted when it becomes not only the event that the refrigerant sensor 2 detects a refrigerant when the indoor unit is in operation but also the event that the refrigerant sensor 2 and the indoor unit are disconnected when the indoor unit is in operation and therefore the connection cannot be detected, the indoor fan can be forcibly operated. Specifically, as shown in FIG. 7, when the refrigerant sensor 2 is disconnected from the indoor unit, the first relay 5 becomes in a non-energized state. When the first relay 5 becomes in the non-energized state, the b-contact 5a of the first relay 5 is closed, so that the indoor fan is switched from the operation mode by the normal control (FIG. 5) to a forced operation mode and forcibly operated. In a state in which the refrigerant sensor 2 and the indoor unit are disconnected, the contact 7 becomes in an "open" state and the compressor cannot be operated.

The fan drive circuit 1 according to this embodiment is configured to operate on the safe side as a fail-safe. With this, even if the refrigerant leaks in a state in which the refrigerant sensor 2 and the indoor unit are disconnected, the indoor fan is forcibly operated, and therefore the leaked refrigerant can be prevented from accumulating on the floor, etc., of the air conditioned room to reach a combustible density. As a result, it is possible to secure the safety of indoor residents or machines and devices arranged indoors at the time of the refrigerant leakage.

The fan drive circuit 1 according to this embodiment is configured such that an air conditioner can be normally operated when the refrigerant sensor 2 as a protection device is connected to the indoor unit, but the air conditioner cannot be operated when the refrigerant sensor 2 is not connected to the indoor unit. Further, it is configured so that, in a state in which the refrigerant sensor 2 is detecting no leaked refrigerant, the indoor fan is operated by a normal control, but the indoor fan is forcibly operated when the refrigerant sensor 2 detects the leaked refrigerant. With this, it is possible to prevent the leaked refrigerant from reaching a combustible density.

Other Modified Examples

The present invention is not limited to the aforementioned embodiments and various modifications are possible within the scope of claims.

For example, in the aforementioned embodiment, the refrigerant sensor is adopted as a protection device, and the indoor fan is forcibly operated when the leaked refrigerant from the indoor unit is detected by the refrigerant sensor to diffuse the leaked refrigerant. However, as a protection device, other than the related refrigerant sensor, for example, an alarm configured to notify a user of the refrigerant leakage by sound, light, etc., when a leaked refrigerant is detected, or a ventilator configured to forcibly discharge air including the leaked refrigerant in a room to the outside of the room may be used. The refrigerant sensor, the alarm, and the ventilator may be used individually or two or more of them may be used in a combined manner.

In the case of using an alarm as a protection device and in the case of using a ventilator, their functions cannot be exerted when the alarm/ventilator and the heat pump device are disconnected. In the case of the former, the existence of the leaked refrigerant cannot be notified to the user, and in the case of the latter, the air in the air conditioned room in which the leaked refrigerant exists cannot be discharged to the outside. In the fan drive circuit of the present invention, however, when the alarm/ventilator and the heat pump device are disconnected, the forced operation circuit configured to operate the fan of the heat pump device as a fail-safe is equipped. Therefore, even if a refrigerant leaks in a state in which the alarm/ventilator and the heat pump device are disconnected, it is possible to prevent the leaked refrigerant from accumulating on the floor, etc., of an air-conditioned room to reach a combustible density, and also possible to secure the safety for the residents, etc., of the indoor room at the time of the refrigerant leakage. In addition, since the heat pump device can be operated in a state in which the ventilator/alarm is connected to the heat pump device, the refrigerant leakage can be controlled.

DESCRIPTION OF REFERENCE SYMBOLS

1: fan drive circuit
2: refrigerant sensor
2a: contact
3: fan motor
4: operation switch
5: first relay
56a: b-contact
6: second relay
6a: a-contact
7: contact

The invention claimed is:

1. A fan drive circuit for a heat pump device configured to blow air heat exchanged by a heat exchanger using a mildly-flammable or flammable refrigerant having a specific gravity greater than air from a blowout port using a fan, the fan drive circuit comprising:
a forced operation circuit configured to switch operation of the fan from a normal operation mode to a forced operation mode in an event that it is undetectable that a protection device configured to prevent a leaked refrigerant from the heat pump device from reaching a combustible density is connected to the heat pump device,
the forced operation mode being a mode in which the fan is operated regardless of whether or not the heat pump device is in an operation state, the normal operation mode being a mode in which the fan is operated in accordance with the operation state of the heat pump device,
the fan drive circuit including a relay configured to operate in conjunction with the protection device, wherein when the relay is unable to detect connection of the protection device to the heat pump device, the relay closes the forced operation circuit.

2. The fan drive circuit of the heat pump device as recited in claim 1, wherein the forced operation circuit is made into a closed circuit on a power source side of an operation switch of the heat pump device.

3. The fan drive circuit of the heat pump device as recited in claim 1, wherein the protection device is a refrigerant sensor configured to detect the refrigerant leakage from the heat exchanger or refrigerant piping connected to the heat exchanger.

4. The fan drive circuit of the heat pump device as recited in claim 2, wherein the relay is configured to make the forced operation circuit open when the protection device is connected to the heat pump device.

5. The fan drive circuit of the heat pump device as recited in claim 4, wherein the protection device is a refrigerant sensor configured to detect the refrigerant leakage from the heat exchanger or refrigerant piping connected to the heat exchanger.

6. The fan drive circuit of the heat pump device as recited in claim 2, wherein the protection device is a refrigerant sensor configured to detect the refrigerant leakage from the heat exchanger or refrigerant piping connected to the heat exchanger.

7. The fan drive circuit of the heat pump device as recited in claim 1, wherein the relay is configured to make the forced operation circuit open when the protection device is connected to the heat pump device.

8. The fan drive circuit of the heat pump device as recited in claim 7, wherein the protection device is a refrigerant sensor configured to detect the refrigerant leakage from the heat exchanger or refrigerant piping connected to the heat exchanger.

9. The fan drive circuit as recited in claim 1, wherein when the protection device is unconnected to the heat pump device, the fan drive circuit does not allow the heat pump device to normally operate.

10. A fan drive circuit for a heat pump device configured to blow air heat exchanged by a heat exchanger using a mildly-flammable or flammable refrigerant having a specific gravity greater than air from a blowout port using a fan, the fan drive circuit comprising:
a forced operation circuit configured to switch operation of the fan from a normal operation mode to a forced operation mode in an event that it is undetectable that a protection device configured to prevent a leaked refrigerant from the heat pump device from reaching a combustible density is connected to the heat pump device,
the forced operation mode being a mode in which the fan is operated regardless of whether or not the heat pump device is in an operation state, the normal operation mode being a mode in which the fan is operated in accordance with the operation state of the heat pump device,
wherein when the protection device is unconnected to the heat pump device, the fan drive circuit does not allow the heat pump device to normally operate.

11. The fan drive circuit as recited in claim 10, wherein the forced operation circuit is made into a closed circuit on a power source side of an operation switch of the heat pump device.

12. The fan drive circuit as recited in claim 10, further comprising a relay configured to make the forced operation circuit open when the protection device is connected to the heat pump device.

13. The fan drive circuit as recited in claim 10, wherein the protection device is a refrigerant sensor configured to detect the refrigerant leakage from the heat exchanger or refrigerant piping connected to the heat exchanger.

* * * * *